US012767822B2

(12) United States Patent
Wu et al.

(10) Patent No.: US 12,767,822 B2
(45) Date of Patent: Oct. 20, 2026

(54) SILOXANE COMPOSITION AND USES THEREOF

(71) Applicant: Wacker Chemie AG, Munich (DE)

(72) Inventors: Junnan Wu, Shanghai (CN); Jian Nie, Shanghai (CN)

(73) Assignee: Wacker Chemie AG, Munich (DE)

( * ) Notice: Subject to any disclaimer, the term of this patent is extended or adjusted under 35 U.S.C. 154(b) by 618 days.

(21) Appl. No.: 18/272,803

(22) PCT Filed: Feb. 9, 2021

(86) PCT No.: PCT/CN2021/076173
§ 371 (c)(1),
(2) Date: Jul. 18, 2023

(87) PCT Pub. No.: WO2022/170456
PCT Pub. Date: Aug. 18, 2022

(65) Prior Publication Data

US 2024/0093032 A1 Mar. 21, 2024

(51) Int. Cl.
*C08L 83/04* (2006.01)
*C09J 183/04* (2006.01)

(52) U.S. Cl.
CPC ............ *C08L 83/04* (2013.01); *C09J 183/04* (2013.01); *C08L 2205/025* (2013.01); *C08L 2205/035* (2013.01)

(58) Field of Classification Search
CPC ............... C08L 83/04; C08L 2205/025; C08L 2205/035; C09J 183/04; C08G 77/20; C08G 77/70; C08G 77/12; C09D 183/04
See application file for complete search history.

(56) References Cited

U.S. PATENT DOCUMENTS

2019/0300767 A1* 10/2019 Fukui ...................... B32B 13/04
2020/0087514 A1* 3/2020 Fukui .................... C08F 299/08

FOREIGN PATENT DOCUMENTS

| | | | | |
|---|---|---|---|---|
| CN | 111154269 A * | 5/2020 | ............. C08L 83/04 |
| EP | 1737504 B1 | 6/2010 | |
| JP | 2018076407 A | 5/2018 | |
| KR | 20160085864 A | 7/2016 | |
| WO | 2019009175 A1 | 1/2019 | |
| WO | 2020121930 A1 | 6/2020 | |

* cited by examiner

*Primary Examiner* — Kumar R Bhushan

(57) ABSTRACT

A siloxane composition, includes: (a) at least one organopolysiloxane containing two alkenyl groups bonded to silicon atoms at both ends of the chain per molecule, (b) at least one organopolysiloxane containing at least three alkenyl groups bonded to silicon atoms per molecule, (c) at least one organopolysiloxane containing two hydrogen atoms bonded to silicon atoms at both ends of the chain per molecule, and (d) at least one hydrosilylation catalyst, with the proviso that component (c) is in an amount of greater than or equal to 30 wt % based on the total weight of the composition, and component (e) at least one organopolysiloxane containing at least three hydrogen atoms bonded to silicon atoms per molecule is in an amount of less than or equal to 0.01 wt % based on the total weight of the composition.

14 Claims, 1 Drawing Sheet

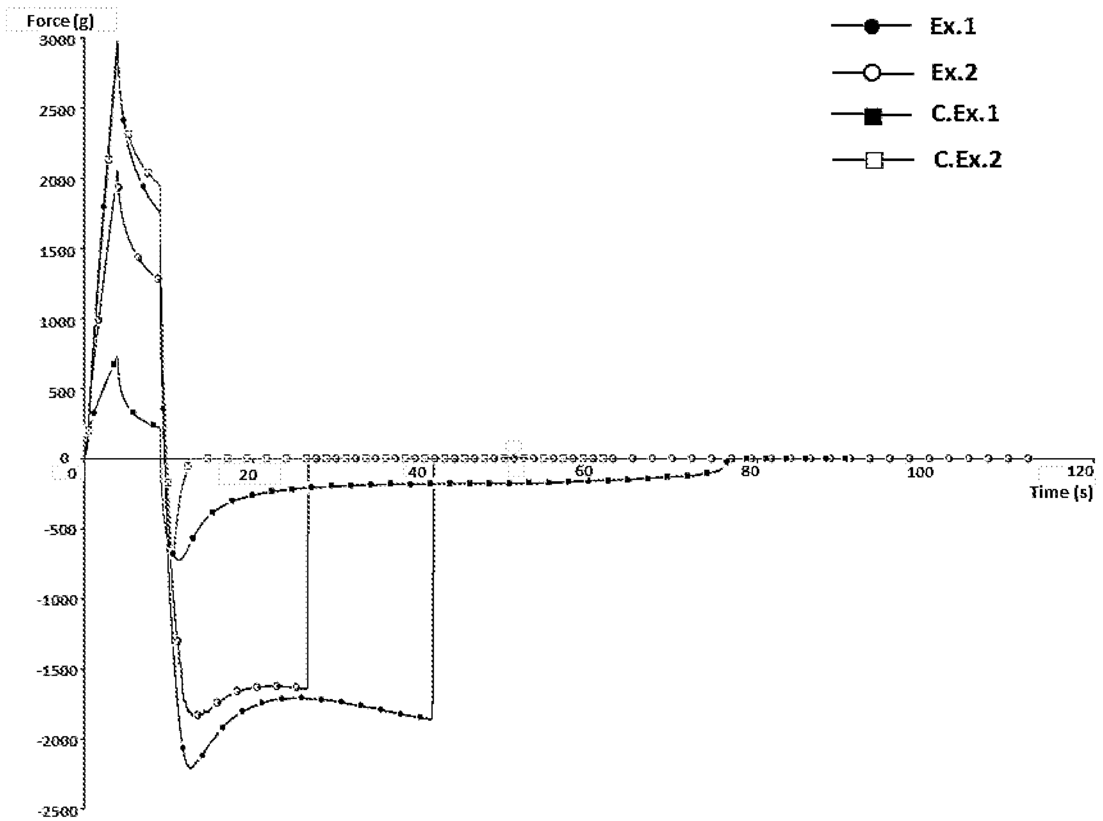
Force (g)
3000
2500
2000
1500
1000
500
0
-500
-1000
-1500
-2000
-2500
0
20
40
60
80
100
120
Time (s)
Ex.1
Ex.2
C.Ex.1
C.Ex.2

SILOXANE COMPOSITION AND USES THEREOF

FIELD OF INVENTION

The present disclosure relates to a siloxane composition and uses thereof.

BACKGROUND OF INVENTION

Silicone gel compositions are addition reaction curable organopolysiloxane compositions which typically comprise i) an organopolysiloxane having at least two silicon-bonded alkenyl groups such as vinyl groups as a base polymer, ii) an organohydrogenpolysiloxane having at least three silicon-bonded hydrogen atoms (i.e. Si—H groups) as a crosslinker, and iii) a platinum-based catalyst, and which yield a cured product via an addition reaction of the Si—H groups to the alkenyl groups.

The cured products of conventional silicone gel compositions usually have a high penetration value (i.e. very soft), which means undesired bubble or peeling caused by low gel strength will inevitably occur if these silicone gels are placed under a negative pressure environment e.g. at high altitudes. Increasing hardness of the cured gels is used to alleviate the problem. However, a higher hardness of cured gels usually leads to a decreased elongation at break and a reduced tackiness, which affects their application in display potting or optical bonding.

Silicone gel compositions using vinyl MQ silicone resin as a crosslinker have also been reported. EP1737504B discloses a silicone gel composition containing 100 parts by weight of vinyl-terminated polydimethylsiloxane with a viscosity of 400 mPa·s, 44 parts by weight of vinyl MQ silicone resin, 18 parts by weight of hydrogen-terminated polydimethylsiloxane with a viscosity of 15 mPa·s and 0.01% of platinum-based catalyst. However, such silicone gel still has a higher penetration value of 135, which is not suitable for use under a negative pressure environment due to the occurrence of bubble or peeling.

SUMMARY OF INVENTION

In view of the existing problems, the present disclosure provides a siloxane composition and a silicone gel cured therefrom which has a suitable low penetration and exhibits at least one or more of the below performances:

1) a higher elongation at break and a better resistance to deformation and tension compared to those existing gels with a same penetration value;
2) a better gel tackiness;
3) an excellent resistance to high temperature, no bubble or peeling occurs when the gel is subject to a temperature of 95° C. for 200 h;
4) an excellent resistance to negative pressure, no bubble or peeling occurs when the gel is subject to a negative pressure of −1 atm for 3 d.

There are two reasons for the occurrence of bubble or peeling. One is that some invisible bubbles in the gel will expand rapidly at high temperature or at negative pressure, which leads to visible expanded bubbles or causes peeling or crack if the strength of gel is not high enough. The other is that the substrate for supporting gel will warp at high temperature or at negative pressure, then the gel will be pulled apart causing peeling or crack if the gel strength is low.

Herein the term "silicone gel" refers to a cured product which has a low cross-linking density, comprises an organopolysiloxane as the primary component, and exhibits a penetration value according to ASTM D1403 (¼ cone) within a range from 20 to 200. This corresponds with a product that returns a measured value (rubber hardness value) of zero for a rubber hardness measurement conducted in accordance with GB/T531-1999, and is of sufficiently low hardness as to exhibit no effective rubber hardness value.

Wherein the term "penetration" refers to the depth to which the standard cone drops feely into the gel sample under a certain load for a certain time. The greater the penetration, the softer the gel and the lower its mechanical strength. Since the mechanical strength of silicone gel increases and the penetration decreases with the increasing of crosslinking density, and the mechanical strength decreases and the penetration increases with the decreasing of the crosslinking density, penetration value of silicone gel can also be used to characterize its crosslinking density. The higher the penetration value, the lower the crosslinking density.

Herein the term "silicone rubber" refers to a cured product which comprises an organopolysiloxane as the primary component, exhibits a measured value (rubber hardness value) for a rubber hardness measurement conducted in accordance with GB/T531-1999 that exceeds zero, and displays an effective rubber hardness value.

Herein the term "tackiness" refers to a property of a material that it is sticky in touch but does not adhere to other materials to any significant degree, which is essentially different from "adhesion". "Adhesion" refers to a property of a material that adheres to other materials for example a substrate, via typically chemical action, and bonding strength is usually used to evaluate adhesion. Besides, adhesion is irreversible, the material cannot adhere to other materials again once stripped therefrom. However, a material with tackiness adheres to other materials via typically physical action and tackiness is reversible, the material can adhere to other materials again once stripped therefrom.

Herein the "viscosity", unless specified, is measured according to conventional methods in the art.

The first aspect of the present disclosure provides a siloxane composition, comprising:

(a) at least one organopolysiloxane containing two alkenyl groups bonded to silicon atoms at both ends of the chain per molecule,
(b) at least one organopolysiloxane containing at least three alkenyl groups bonded to silicon atoms per molecule,
(c) at least one organopolysiloxane containing two hydrogen atoms bonded to silicon atoms at both ends of the chain per molecule, and
(d) at least one hydrosilylation catalyst;

with the proviso that component (c) is used in an amount of greater than or equal to 30 wt %, preferably greater than or equal to 40 wt %, based on the total weight of the composition, and that the composition comprises less than or equal to 0.01 wt % of component (e) at least one organopolysiloxane containing at least three hydrogen atoms bonded to silicon atoms per molecule based on the total weight of the composition.

Component (a)

The organopolysiloxane (a) is well known. Alkenyl groups are bonded to silicon atoms at both ends of the chain, and groups bonded to the remaining silicon atoms are each independently selected from monovalent organic groups free of aliphatic unsaturation.

The organopolysiloxane (a) is typically linear. Some exemplary polyorganosiloxanes (a) can be described by the formula as follows:

$$R^1R^2_2SiO(R^2_2SiO)_mSiR^2_2R^1$$

wherein $R^1$ is independently at each occurrence an alkenyl group having from 2 to 6 carbon atoms, for example vinyl, allyl, propenyl, butenyl, hexenyl, preferably vinyl, allyl and propenyl, more preferably vinyl;

$R^2$ is independently at each occurrence a substituted or unsubstituted monovalent organic group especially monovalent hydrocarbon group having from 1 to 20 preferably 1 to 10 carbon atoms, for example, alkyl such as methyl, ethyl, propyl, butyl, pentyl, hexyl, octyl, aryl or alkaryl such as phenyl, tolyl, xylyl, mesityl, ethylphenyl, benzyl, naphthyl, and halogenated or organic-group-functionalized derivatives of the above groups such as 3,3,3-trifluoropropyl, o-, p- and m-chlorophenyl, aminopropyl, 3-isocyanatopropyl, cyanoethyl, preferably methyl and phenyl, more preferably methyl;

m is a positive number, and is such that the organopolysiloxane (a) has a dynamic viscosity at 25° C. of from 100 to 50,000 mPa·s, for example from 200 to 20,000 mPa·s, particularly from 500 to 10,000 mPa·s.

Component (a) of the present disclosure may be a single alkenyl-terminated organopolysiloxane, or may be a mixture of different alkenyl-terminated organopolysiloxanes which differ in molecular structure (for example type and number of substituents), or viscosity. For a mixture of organopolysiloxanes, m represents an average value, and the viscosity range met by m is relative to the viscosity of the mixture.

Generally, silicone compositions used as potting materials are required to have a lower viscosity, and correspondingly the viscosity of alkenyl-terminated organopolysiloxane is usually low. However, in order to reduce the crosslinking density, and obtain a silicone gel with higher elongation at break, better tackiness and lower penetration, a small amount of alkenyl-terminated organopolysiloxane with a high viscosity is preferred to be incorporated in component (a).

In an embodiment herein, component (a) comprises (a1) an organopolysiloxane containing two alkenyl groups bonded to silicon atoms at both ends of the chain per molecule with a dynamic viscosity of greater than or equal to 100 mPa·s and less than 5,000 mPa·s at 25° C. and (a2) an organopolysiloxane containing two alkenyl groups bonded to silicon atoms at both ends of the chain per molecule with a dynamic viscosity of greater than or equal to 5,000 mPa·s and less than or equal to 50,000 mPa·s at 25° C. According to the above embodiment, component (a2) is suitably used in an amount of from 2 wt % to 20 wt % for example from 5 wt % to 15 wt % based on the total weight of composition (a); the ratio of the number of moles of alkenyl groups provided by component (a1) to that provided by component (a2) is preferably (10-50):1.

In the present disclosure, component (a) is suitably used in an amount of from 20 wt % to 70 wt %, for example from 35 wt % to 55 wt %, based on the total weight of the composition.

Component (b)

The organopolysiloxane as component (b), acting as a crosslinker, is different from the organopolysiloxane as component (a). The polyorganosiloxane (b) may be linear, branched or resinous. Linear polyorganosiloxane (b) is typically composed of units selected from $R^2_3SiO_{1/2}$, $R^1R^2SiO_{2/2}$, $R^1R^2_2SiO_{1/2}$ and $R^2_2SiO_{2/2}$, wherein $R^1$ and $R^2$ are as defined above. Branched or resinous polyorganosiloxane (b) further comprises trifunctional units such as $R^1SiO_{3/2}$ and $R^2SiO_{3/2}$, and/or tetrafunctional units such as $SiO_{4/2}$, wherein $R^1$ and $R^2$ are as defined above.

Some exemplary polyorganosiloxanes (b) includes (b1) an organopolysiloxane consisting essentially of $R^1R^2_2SiO_{1/2}$ and $SiO_{4/2}$ units, (b2) an organopolysiloxane consisting essentially of $R^2_3SiO_{1/2}$ and $R^1R^2SiO_{2/2}$ units, (b3) an organopolysiloxane consisting essentially of $R^1R^2_2SiO_{1/2}$, $R^1R^2SiO_{2/2}$ and $R^2_2SiO_{2/2}$ units, and (b4) an organopolysiloxane consisting essentially of $R^1R^2_2SiO_{1/2}$, $R^2_2SiO_{2/2}$ and $R^2SiO_{3/2}$ units, wherein $R^1$ and $R^2$ are as defined above. Herein "essentially" means that the polyorganosiloxane (b) contains at least 80 mol %, for example at least 90 mol %, even at least 95 mol % of the units listed above.

In the present disclosure, polyorganosiloxanes (b1) is particularly preferred, and the molar ratio of $R^1R^2_2SiO_{1/2}$ units to $SiO_{4/2}$ units is suitably within a range of (0.4-1): 1, for example (0.5-0.9):1.

Component (b) is suitably used in an amount of from 1 wt % to 10 wt %, for example from 2 wt % to 8 wt %, based on the total weight of the composition.

Component (c)

Component (c) is used as a chain extender. Preferably component (c) has a dynamic viscosity of greater than or equal to 30 mPa·s and less than 1,000 mPa·s at 25° C.

The organopolysiloxane (c) is typically linear. Some exemplary polyorganosiloxanes (c) can be described by the formula as follows:

$$HR^2_2SiO(R^2_2SiO)_nSiR^2_2H$$

wherein $R^2$ is as defined above;

n is a positive number, and is such that the organopolysiloxane (c) has a dynamic viscosity of greater than or equal to 30 mPa·s and less than 1,000 mPa·s at 25° C.

Component (c) of the present disclosure may be a single hydrogen-terminated organopolysiloxane, or may be a mixture of different hydrogen-terminated organopolysiloxanes which differ in molecular structure (for example type and number of substituents), or viscosity. For a mixture of organopolysiloxanes, n represents an average value, and the viscosity range met by n is relative to the viscosity of the mixture.

In order to obtain a silicone gel with a better tackiness and lower penetration, component (c) of the present disclosure preferably comprises (c1) an organopolysiloxane containing two hydrogen atoms bonded to silicon atoms at both ends of the chain per molecule with a dynamic viscosity of greater than or equal to 30 mPa·s and less than or equal to 200 mPa·s at 25° C. and (c2) an organopolysiloxane containing two hydrogen atoms bonded to silicon atoms at both ends of the chain per molecule with a dynamic viscosity of greater than 200 mPa·s and less than or equal to 5,000 mPa·s at 25° C. According to the above embodiment, the ratio of the number of moles of Si—H groups provided by component (c1) to that provided by component (c2) is preferably 2: (1-10), particularly 1: (1-5).

In the present disclosure, component (c) provides 0.6 to 1.0 moles of Si—H groups per mole of total silicon-bonded alkenyl groups in components (a) and (b).

Component (c) is suitably used in an amount of from 30 wt % to 70 wt %, for example from 40 wt % to 60 wt %, based on the total weight of the composition.

Component (d)

Component (d) can be a variety of hydrosilylation catalysts used in the prior arts for addition-curing silicone compositions, preferably a platinum-based catalyst, for example chloroplatinic acid, chloroplatinates, olefin complexes of platinum, and alkenylsiloxane complexes of platinum. The platinum-based catalyst can be used in an amount subject to the desired curing rate and economic consideration, which is usually a minimum level required to ensure an effective hydrosilylation reaction. Generally, the weight of platinum metal in the siloxane composition is from 0.1 to 500 ppm, for example from 1 to 100 ppm.

Component (e)

The polyorganosiloxane (e), containing at least three hydrogen atoms bonded to silicon atoms per molecule, may be linear, cyclic, branched or resinous. Linear or cyclic polyorganosiloxane (e) is typically composed of units selected from $R^2_3SiO_{1/2}$, $HR^2SiO_{2/2}$, $HR^2_2SiO_{1/2}$ and $R^2_2SiO_{2/2}$, wherein $R^2$ is as defined above. Branched or resinous polyorganosiloxane (e) further comprises trifunctional units such as $HSiO_{3/2}$ and $R^2SiO_{3/2}$, and/or tetrafunctional units such as $SiO_{4/2}$, wherein $R^2$ is as defined above.

The siloxane composition of the present disclosure is free of polyorganosiloxane (e). "Free of" means polyorganosiloxane (e) is in an amount of less than or equal to 0.01 wt %, even less than or equal to 0.001 wt %, based on the total weight of the composition Component (f)

The siloxane composition may further comprise inhibitor (f) to control the pot life and curing rate of the composition. The inhibitor can be a variety of inhibitors used in the art, for example alkynol such as 1-ethynyl-1-cyclohexanol, 2-methyl-3-butyn-2-ol; polymethylvinylcyclosiloxanes, such as 1,3,5,7-tetravinyltetramethyltetracyclo-siloxane, alkyl maleate. The amount of the inhibitor can be selected according to its chemical structure and the desired curing rate. Generally, the weight of inhibitor in the composition is from 1 to 50,000 ppm, for example from 10 to 10,000 ppm.

Other Optical Components

The siloxane composition may further comprise a filler if needed. Examples of fillers include non-thermal conductive fillers such as calcium carbonate, fumed silica, precipitated silica, silica powder, diatomaceous earth, zirconium silicate, organic montmorillonite, titanium dioxide, and thermally conductive fillers such as aluminum oxide, zinc oxide, magnesium oxide, aluminum hydroxide, aluminum nitride, boron nitride, silicon carbide, aluminum, copper, nickel, gold, silver, graphite, graphene, but not limited thereto. As is known in the art, siloxane compositions used as adhesive, sealant or protective agent or potting material for electronic components may contain an appropriate amount of fillers; while siloxane compositions used as potting material or optical bonding material for displays should not contain fillers due to the requirement of light transmittance.

The siloxane composition may also comprise an appropriate amount of other additives, as long as such additives do not impair the effects of the present invention. Examples of such additives include solvents, diluents, surface treatment agents for fillers and color pastes, but not limited thereto. Examples of solvents to be mentioned are decamethylcyclopentasiloxane, hexamethyldisiloxane, octamethyltrisiloxane, heptamethylhexyltrisiloxane, decamethyltetrasiloxane, dodecamethylpentasiloxane, tetradecamethylhexasiloxane, isododecane. Examples of diluents to be measured are dimethyl silicone oils having a dynamic viscosity of from 10 to 5,000 mPa·s at 25° C., MDT silicone oils having a dynamic viscosity of from 15 to 300 mPa·s at 25° C. Preferably, the composition does not contain any of the aforesaid additives. "Not contain" means the siloxane composition contains less than 0.1 wt %, even less than 0.01 wt %, of the aforesaid additives based on the total weight of the composition.

In a preferred embodiment, the siloxane composition comprises:

(a) 20-70 wt % of at least one organopolysiloxane containing two alkenyl groups bonded to silicon atoms at both ends of the chain per molecule, (b) 1-10 wt % of at least one organopolysiloxane containing at least three alkenyl groups bonded to silicon atoms per molecule, (c) 30-70 wt % of at least one organopolysiloxane containing two hydrogen atoms bonded to silicon atoms at both ends of the chain per molecule, and (d) at least one hydrosilylation catalyst.

Suitably the siloxane composition of the present disclosure is stored as two or more separate packages where components (b), (c) and (d) are not stored in the same package and components (a), (c) and (d) are not stored in the same package.

The siloxane composition of the present disclosure has a viscosity at room temperature (23±2°) C. of suitably from 200 to 10,000 mPa·s, for example from 500 to 5,000 mPa, especially from 500 to 2,000 mPa·s. The viscosity herein refers to a mixed viscosity of the composition before curing. When the composition is stored in two or more separate packages, the viscosity also refers to the viscosity of each package.

The second aspect of the present disclosure provides a silicone gel cured from the siloxane composition of the first aspect of the present disclosure.

It is obtained by crosslinking or curing the composition described in the first aspect of the present disclosure, or mixing the separate packages as described above followed by crosslinking or curing. Generally, the crosslinking or curing is carried out at a temperature of 15-180° C. for 10 min-72 h. A lower curing temperature and a short curing time are desired. Preference is given to curing at a temperature of 20-80° C. for 15-120 min.

The silicone gel preferably has a penetration value of from 20 to 50 measured according to ASTM D1403 at ¼ cone.

The third aspect of the present disclosure provides use of the siloxane composition of the first aspect as adhesive, sealant or protective agent for electronic components.

The cured siloxane composition of the present disclosure is in a gel form and is excellent in elongation at break, deformability and followingness, it can be used as adhesive, sealant or protective agent for electronic components. Such electronic components include but are not limited to circuit boards, CPUs, and mobile phones.

The fourth aspect of the present disclosure provides use of the siloxane composition of the first aspect as potting material for electronic components or displays.

The siloxane composition of the present disclosure has a low viscosity and good fluidity, which facilitates the operation for potting of pressure sensors, metering sensors, insulated gate bipolar transistors, and displays especially large format displays such as large format educational displays, outdoor displays, large format touch screens, and touch automotive, navigation or aviation displays, etc. Herein the large format display generally refers to a display with a size of greater than or equal to 50 inches, even greater than or equal to 86 inches.

The siloxane composition of the present disclosure is used to fill the gap between the large format display and glass panel so that the air in the gap is discharged, making the display anti-reflective. Moreover, the cured siloxane composition of the present disclosure is a gel with a low penetration and is excellent in tackiness, light transmittance and negative pressure resistance, it can be suitable for display potting at high altitudes.

The fifth aspect of the present disclosure provides use of the siloxane composition of the first aspect as optical bonding material for displays.

The cured siloxane composition of the present disclosure is in a gel form and is excellent in elongation at break, deformability, followingness, tackiness and light transmittance, it can be used as optical bonding material for displays especially large format displays. In addition, the cured gel has a low penetration and is excellent in resistance to negative pressure, which is suitable for optical bonding at high altitudes.

BRIEF DESCRIPTION OF THE DRAWINGS

FIG. 1 demonstrates tackiness test curves of the silicone gels derived by Examples 1-2 and Comparative Examples 1-2.

DETAILED DESCRIPTION OF THE PREFERRED EMBODIMENT

The present invention is further illustrated by the following examples, but is not limited to the scope thereof. Any experimental methods with no conditions specified in the following examples are selected according to the conventional methods and conditions, or product specifications.

Determination of Viscosity

The viscosities of components A and B were measured by Brookfield viscometer using No. 03 spindle at a speed of 10 rpm at room temperature (23±2°) C.

Determination of Penetration

It was carried out according to ASTM D1403 using a¼ scale cone of 9.38 g at room temperature (23±2°) C. Samples to be tested shall have a diameter of greater than or equal to 35 mm and a depth of greater than or equal to 30 mm. Before the test each siloxane composition was poured into a flat-bottomed glass dish and cured at 65° C. for 30 min. Then the glass dish with the sample to be tested was placed on a platform of a penetrometer, which was adjusted to an appropriate position via a crane and fixed, afterwards the rod connecting the cone was slowly lowered by a handwheel until it was observed through a mirror that the cone tip touched the surface of the sample, then the standard cone penetrated to the sample when released to fall under its own weight for 10 s after zero setting, and the depth was recorded by a displacement indicator. The same sample was tested in parallel for at least 3 times, and the distances between each test point and the glass dish edge should not be less than 10 mm. The standard cone should be replaced with a clean one or wiped by a cotton or cloth dipped with alcohol for each test. The average of each test was taken as the result.

Determination of Shore Hardness A

It was conducted according to standard GB/T531-1999.

Determination of Tackiness

It was determined by a texture analyzer using a P/25 cone. Before the test a flat-bottomed glass dish (with a diameter of 35 mm and a depth of 30 mm) was filled with the siloxane composition and was subjected to 65° C. for 30 min. Then the glass dish with the sample to be tested was placed directly under the test cone, afterwards the texture analyzer was turned on and the test cone moved down at a speed of 2 mm/s to the surface of the sample until it penetrated the sample to a depth of 2 mm, then the test cone was kept still for 5 s to make it fully infiltrated by the sample afterwards it moved upwards at a speed of 2 mm/s until the sample was separated therefrom. Forces with time of the test cone penetrating into the sample and pulled out of the sample were recorded by the sensor. The tackiness of the sample can be evaluated according to the area enclosed below the time axis by the force-time curve and the time axis. The larger the area is, the better the tackiness is.

High Temperature Test

Each component A and B were mixed at a ratio of 1:1 by a static mixer, and the obtained mixture was applied to a polarizer of an 80-inch display in a mode of fishbone diagram, then a glass panel was covered thereon slightly. No bubble should be occurred during the whole process. Afterwards the product was subjected to 65° C. for 30 min, and then left still at room temperature for 3 days before it was placed in an oven of 95° C. for 200 h. The product was determined to pass the high temperature test if no bubble or peeling was observed or no separation between the gel and polarizer or glass panel occurred after being placed at 95° C. for 200 h.

Negative Pressure Test

Each component A and B were mixed at a ratio of 1:1 by a static mixer, and the obtained mixture was applied to a polarizer of a 14-inch display in a mode of fishbone diagram, then a glass panel was covered thereon slightly. No bubble should be occurred during the whole process. Afterwards the product was subjected to 65° C. for 30 min, and then left still at room temperature for 3 days before it was placed in an environment of −1 atm for 3 d. The product was determined to pass the negative pressure test if no bubble or peeling was observed or no separation between the gel and polarizer or glass panel occurred after being placed at −1 atm for 3 d.

Details of the raw materials used in the Examples and Comparative Examples are as follows.

a1: dimethylvinylsiloxy-terminated polydimethylsiloxane, with a dynamic viscosity of about 1,000 mPa·s at 25° C. and a vinyl content of 0.124 mmol/g, supplied by Wacker Chemicals.

a2: dimethylvinylsiloxy-terminated polydimethylsiloxane, with a dynamic viscosity of about 20,000 mPa·s at 25° C. and a vinyl content of 0.042 mmol/g, supplied by Wacker Chemicals.

b1: vinyl MQ resin, with a molar ratio of M units to Q units of 0.7:1 and a vinyl content of 0.78 mmol/g, supplied by Wacker Chemicals.

b2: trimethylsiloxy-terminated polydimethylsiloxane having multiple vinyl groups bonded to silicon atoms in the side chain, with a dynamic viscosity of 340 to 820 mPa·s at 25° C. and a vinyl content of 2.8 mmol/g, supplied by Wacker Chemicals.

c1: dimethylhydrosiloxy-terminated polydimethylsiloxane, with a dynamic viscosity of about 65 mPa·s at 25° C. and a hydrogen content of 0.53 mmol/g, supplied by Wacker Chemicals.

c2: dimethylhydrosiloxy-terminated polydimethylsiloxane, with a dynamic viscosity of about 1,000 mPa·s at 25° C. and a hydrogen content of 0.12 mmol/g, supplied by Wacker Chemicals.

c3: dimethylhydrosiloxy-terminated polydimethylsiloxane, with a dynamic viscosity of about 15 mPa·s at 25° C. and a hydrogen content of 1.8 mmol/g, supplied by Wacker Chemicals.

d: platinum-based catalyst, WACKER® CATALYST EP, supplied by Wacker Chemicals.

e: trimethylsiloxy-terminated polydimethylsiloxane having multiple hydrogen atoms bonded to silicon atoms in the side chain, with a dynamic viscosity of 150 mPa·s at 25° C. and a hydrogen content of 1.8 mmol/g, supplied by Wacker Chemicals.

f: inhibitor, WACKER® INHIBITOR PT 88, supplied by Wacker Chemicals.

g: methyl MQ resin, WACKER® MQ 803, supplied by Wacker Chemicals.

Examples 1-2 and Comparative Examples 1-3

According to the formulas in Table 1, the ingredients in each Component A and Component B were mixed well respectively. Then Component A and B were mixed respectively and the obtained mixture was cured at 65° C. for 30 min to give a silicone gel.

Table 2 shows penetration values of the silicone gels obtained in each example and comparative example. Since Comparative Example 3 gave a silicone rubber instead of a silicone gel, Shore hardness A was measured.

FIG. 1 depicts tackiness test curves of the silicone gels derived by Examples 1-2 and Comparative Examples 1-2. It can be seen that the one derived by Example 1 exhibits excellent tackiness, and the one of Example 2 displays good tackiness, while those of Comparative Examples 1-2 shows a significantly worse tackiness than those of Examples 1-2. The silicone rubber derived by Example 3 had no tackiness, so the corresponding test was not performed.

Table 3 shows test results of the silicone gels obtained in Examples 1-2 and Comparative Examples 1-2 under high temperature and negative pressure. The one of Comparative Example 1 failed both tests since bubble or peeling was observed after the tests. The one of Comparative Example 2 also failed both tests since separation between the gel and polarizer or glass panel was observed after the tests.

TABLE 1

| | Ingredients (parts by weight) | Example 1 | Example 2 | Comparative Example 1 | Comparative Example 2 | Comparative Example 3 |
|---|---|---|---|---|---|---|
| Component A | a1 | 86.05 | 86.05 | 86.05 | 86.05 | 86.05 |
| | a2 | 7.96 | 7.96 | 7.96 | 7.96 | 7.96 |
| | b1 | 5.88 | / | 5.88 | 5.88 | 5.88 |
| | b2 | / | 2.1 | / | / | / |
| | g | / | 3.78 | / | / | / |
| | d | 0.10 | 0.10 | 0.10 | 0.10 | 0.10 |
| | visosity (mPa · s) | 1,450 | 1,240 | 1,450 | 1,450 | 1,450 |
| Component B | a2 | 1.47 | 1.47 | 1.47 | 1.47 | 1.47 |
| | b1 | 1.09 | / | 1.09 | 1.09 | 1.09 |
| | g | / | 1.09 | / | / | / |
| | c1 | 7.79 | 7.79 | / | / | / |
| | c2 | 89.25 | 89.25 | 97.05 | / | 50.00 |
| | c3 | / | / | / | 8.24 | / |
| | e | / | / | / | / | 4.60 |
| | f | 0.39 | 0.39 | 0.39 | 0.39 | 0.39 |
| | visosity (mPa · s) | 1,000 | 995 | 1,085 | NG* | 940 |
| Si—H/Si—Vi (molar ratio) | | 0.899 | 0.876 | 0.706 | 0.899 | 0.865 |

*Not measured.

TABLE 2

| | Example 1 | Example 2 | Comparative Example 1 | Comparative Example 2 | Comparative Example 3 |
|---|---|---|---|---|---|
| Penetration value | 32 | 32 | 62 | 31 | / |
| Shore hardness A | / | / | / | / | 12 |

TABLE 3

| | Example 1 | Example 2 | Comparative Example 1 | Comparative Example 2 |
|---|---|---|---|---|
| High temperature test | passed | passed | failed | failed |
| Negative pressure test | passed | passed | failed | failed |

What is claimed is:

1. A siloxane composition, comprising:

(a) at least one organopolysiloxane containing two alkenyl groups bonded to silicon atoms at both ends of the chain per molecule, (b) at least one organopolysiloxane containing at least three alkenyl groups bonded to silicon atoms per molecule, (c) at least one organopolysiloxane containing two hydrogen atoms bonded to silicon atoms at both ends of the chain per molecule, and (d) at least one hydrosilylation catalyst;

with the proviso that component (c) is used in an amount of greater than or equal to 30 wt % based on the total weight of the composition, component (c) has a dynamic viscosity of greater than or equal to 30 mPa·s and less than 1,000 mPa·s at 25° C., and that the composition comprises less than or equal to 0.01 wt % of component (e) at least one organopolysiloxane containing at least three hydrogen atoms bonded to silicon atoms per molecule based on the total weight of the composition.

2. The siloxane composition of claim 1, wherein component (c) is used in an amount of greater than or equal to 40 wt % based on the total weight of the composition.

3. The siloxane composition of claim 1, wherein component (c) comprises (c1) an organopolysiloxane containing two hydrogen atoms bonded to silicon atoms at both ends of the chain per molecule with a dynamic viscosity of greater than or equal to 30 mPa·s and less than or equal to 200 mPa·s at 25° C. and (c2) an organopolysiloxane containing two hydrogen atoms bonded to silicon atoms at both ends of the chain per molecule with a dynamic viscosity of greater than 200 mPa·s and less than or equal to 5,000 mPa·s at 25° C.

4. The siloxane composition of claim 3, wherein the ratio of the number of moles of Si—H groups provided by component (c1) to that provided by component (c2) is 2:(1-10).

5. The siloxane composition of claim 1, wherein component (c) provides 0.6 to 1.0 moles of Si—H groups per mole of total silicon-bonded alkenyl groups in components (a) and (b).

6. The siloxane composition of claim 1, wherein component (b) is selected from the group consisting of (b1) an organopolysiloxane consisting essentially of $R^1R^2_2SiO_{1/2}$ and $SiO_{4/2}$ units, (b2) an organopolysiloxane consisting essentially of $R^2_3SiO_{1/2}$ and $R^1R^2SiO_{2/2}$ units, (b3) an organopolysiloxane consisting essentially of $R^1R^2_2SiO_{1/2}$, $R^1R^2SiO_{2/2}$ and $R^2_2SiO_{2/2}$ units, and (b4) an organopolysiloxane consisting essentially of $R^1R^2_2SiO_{1/2}$, $R^2_2SiO_{2/2}$ and $R^2SiO_{3/2}$ units;

wherein $R^1$ is independently at each occurrence an alkenyl group having from 2 to 6 carbon atoms, and $R^2$ is independently at each occurrence a monovalent hydrocarbon group free of aliphatic unsaturation having from 1 to 20 carbon atoms.

7. The siloxane composition of claim 1, wherein component (a) comprises (a1) an organopolysiloxane containing two alkenyl groups bonded to silicon atoms at both ends of the chain per molecule with a dynamic viscosity of greater than or equal to 100 mPa·s and less than 5,000 mPa·s at 25° C. and (a2) an organopolysiloxane containing two alkenyl groups bonded to silicon atoms at both ends of the chain per molecule with a dynamic viscosity of greater than or equal to 5,000 mPa·s and less than or equal to 50,000 mPa·s at 25° C.

8. The siloxane composition of claim 1, wherein the composition comprises:

(a) 20-70 wt % of at least one organopolysiloxane containing two alkenyl groups bonded to silicon atoms at both ends of the chain per molecule, (b) 1-10 wt % of at least one organopolysiloxane containing at least three alkenyl groups bonded to silicon atoms per molecule, (c) 30-70 wt % of at least one organopolysiloxane containing two hydrogen atoms bonded to silicon atoms at both ends of the chain per molecule, and (d) at least one hydrosilylation catalyst.

9. A silicone gel cured from the siloxane composition of claim 1.

10. The silicone gel of claim 9, characterized by a penetration value of from 20 to 50 measured according to ASTM D1403 at ¼ cone.

11. A potting material, comprising the siloxane composition of claim 1.

12. A potting material for displays, comprising the siloxane composition of claim 1.

13. An optical bonding material, comprising the siloxane composition of claim 1.

14. An optical bonding material for displays, comprising the siloxane composition of claim 1.

* * * * *